United States Patent
Vandegrift et al.

(10) Patent No.: US 11,365,880 B2
(45) Date of Patent: Jun. 21, 2022

(54) LOW NOX, HIGH EFFICIENCY, HIGH TEMPERATURE, STAGED RECIRCULATING BURNER AND RADIANT TUBE COMBUSTION SYSTEM

(71) Applicants: SPINWORKS INTERNATIONAL CORPORATION, North East, PA (US); SELAS HEAT TECHNOLOGY COMPANY LLC, Streetsboro, OH (US)

(72) Inventors: Chris Edward Vandegrift, Milford, OH (US); Thomas D. Briselden, North East, PA (US); Mitchell D. Cornelius, Soddy Daisy, TN (US); Anthony J. Zambanini, Seven Fields, PA (US); Thomas M. Reilly, Dudley, MA (US)

(73) Assignees: SAINT-GOBAIN CERAMICS & PLASTICS, INC., Worcester, MA (US); SELAS HEAT TECHNOLOGY COMPANY LLC, Streetsboro, OH (US)

( * ) Notice: Subject to any disclaimer, the term of this patent is extended or adjusted under 35 U.S.C. 154(b) by 218 days.

(21) Appl. No.: 16/457,774

(22) Filed: Jun. 28, 2019

(65) Prior Publication Data
US 2019/0338945 A1 Nov. 7, 2019

Related U.S. Application Data

(63) Continuation of application No. 14/863,563, filed on Sep. 24, 2015, now Pat. No. 10,458,646.
(Continued)

(51) Int. Cl.
*F23C 9/08* (2006.01)
*F23L 15/04* (2006.01)
(Continued)

(52) U.S. Cl.
CPC .............. *F23C 9/08* (2013.01); *F23C 3/002* (2013.01); *F23C 6/042* (2013.01); *F23C 7/06* (2013.01);
(Continued)

(58) Field of Classification Search
CPC .. F23C 9/08; F23C 3/002; F23C 6/042; F23C 7/06; F23C 9/006; F23C 2201/20;
(Continued)

(56) References Cited

U.S. PATENT DOCUMENTS 1,077,160 A * 10/1913 Reese ..................... F22B 1/26
122/348
2,619,022 A * 11/1952 Hergenrother ......... F23J 13/025
454/46
(Continued)

FOREIGN PATENT DOCUMENTS

CN 101725985 A 6/2010
CN 102859278 A 1/2013
(Continued)

OTHER PUBLICATIONS

PCT Search Report for PCT/US2015/052154, dated Dec. 7, 2015, 5 pgs.

*Primary Examiner* — David J Laux
(74) *Attorney, Agent, or Firm* — Abel Schillinger, LLP; Adrian Lawrence

(57) ABSTRACT

Embodiments of the present invention include high-temperature staged recirculating burners and radiant tube burner assemblies that provide high efficiency, low NOx and CO emissions, and uniform temperature characteristics. One such staged recirculating burner includes a combustion tube having inside and outside helical fins forming opposing spiral pathways for combustion gases and products of combustion, a combustion nozzle coupled to the combustion
(Continued)

tube, a gas tube running axially into the combustion tube, and a staging gas nozzle coupled to the gas tube, where the staging gas nozzle includes radial exit holes into the combustion tube and an axial gas staging tube extending into the combustion nozzle to stage combustion.

9 Claims, 5 Drawing Sheets

Related U.S. Application Data

(60) Provisional application No. 62/055,095, filed on Sep. 25, 2014.

(51) Int. Cl.
| | |
|---|---|
| *F23C 3/00* | (2006.01) |
| *F23C 6/04* | (2006.01) |
| *F23C 9/00* | (2006.01) |
| *F23D 14/24* | (2006.01) |
| *F23D 14/66* | (2006.01) |
| *F23C 7/06* | (2006.01) |

(52) U.S. Cl.
CPC ............. *F23C 9/006* (2013.01); *F23D 14/24* (2013.01); *F23D 14/66* (2013.01); *F23L 15/04* (2013.01); *F23C 2201/20* (2013.01); *F23C 2900/03005* (2013.01); *F23C 2900/09002* (2013.01); *Y02E 20/34* (2013.01)

(58) Field of Classification Search
CPC .. F23C 2900/03005; F23C 2900/09002; F23D 14/24; F23D 14/66; F23L 15/04; F23L 15/00; F23L 15/02
See application file for complete search history.

(56) References Cited

U.S. PATENT DOCUMENTS

| | | | | |
|---|---|---|---|---|
| 2,847,193 A * | 8/1958 | Carter | ...................... | F28D 7/022 165/11.1 |
| 3,170,504 A * | 2/1965 | Lanning | .................. | F23D 14/14 431/328 |
| 3,251,396 A * | 5/1966 | Nitsche | ................. | F23D 14/125 431/328 |
| 4,090,558 A * | 5/1978 | Akama | ................... | F28D 7/103 165/155 |
| 4,298,333 A * | 11/1981 | Wunning | .................. | F28F 1/42 431/11 |
| 4,377,618 A * | 3/1983 | Ikeda | ....................... | H05B 3/10 428/323 |
| 4,448,348 A * | 5/1984 | Bidwell | .................. | F24B 7/005 165/184 |
| 4,479,535 A * | 10/1984 | Echigo | ...................... | F28D 7/12 165/142 |
| 4,589,844 A * | 5/1986 | Loukas | ................... | F28D 7/103 432/223 |
| 4,643,667 A * | 2/1987 | Fleming | ................. | F23D 14/16 431/328 |
| 4,673,350 A * | 6/1987 | Collier | ................... | F23D 14/24 126/91 A |
| 4,878,837 A * | 11/1989 | Otto | ...................... | C04B 38/067 431/328 |
| 4,889,481 A * | 12/1989 | Morris | .................... | B32B 18/00 431/328 |
| 4,915,038 A | 4/1990 | Sujata et al. | | |
| 4,977,111 A * | 12/1990 | Tong | ........................ | C04B 30/02 501/95.1 |
| 5,016,610 A | 5/1991 | Meguro et al. | | |
| 5,165,887 A * | 11/1992 | Ahmady | ................. | F23D 14/16 126/92 AC |
| 5,203,690 A | 4/1993 | Maruko | | |
| 5,218,952 A * | 6/1993 | Neufeldt | ................ | E01C 23/14 126/92 AC |
| 5,224,542 A | 7/1993 | Hemsath | | |
| 5,241,949 A | 9/1993 | Collier | | |
| 5,326,255 A * | 7/1994 | Wunning | ................ | F23C 3/002 431/215 |
| 5,326,257 A * | 7/1994 | Taylor | ..................... | F23D 14/14 431/329 |
| 5,356,487 A * | 10/1994 | Goldstein | ............... | H02S 10/30 136/253 |
| 5,380,192 A * | 1/1995 | Hamos | ..................... | F23D 14/02 431/328 |
| 5,476,375 A * | 12/1995 | Khinkis | ..................... | F24H 1/40 431/7 |
| 5,500,054 A * | 3/1996 | Goldstein | ............... | H02S 10/30 136/246 |
| 5,570,679 A | 11/1996 | Wunning | | |
| 5,749,721 A * | 5/1998 | Klinge | ..................... | F23D 14/16 431/328 |
| 5,762,885 A * | 6/1998 | Debbage | ............ | B01D 53/8696 422/171 |
| 5,775,317 A | 7/1998 | Finke | | |
| 5,782,629 A * | 7/1998 | Lannutti | .................. | F23D 14/16 431/326 |
| 5,833,450 A * | 11/1998 | Wunning | ................ | F23L 15/04 431/215 |
| 5,882,184 A | 3/1999 | Feldermann | | |
| 5,993,192 A * | 11/1999 | Schmidt | .................. | F23D 14/18 431/12 |
| 6,024,083 A | 2/2000 | Smirnov | | |
| 6,027,333 A | 2/2000 | Fujii et al. | | |
| 6,033,208 A * | 3/2000 | Wunning | ................ | F23L 15/02 431/215 |
| 6,190,159 B1 * | 2/2001 | Moore | .................... | F23L 15/04 431/11 |
| 6,321,743 B1 * | 11/2001 | Khinkis | .................. | F23C 3/002 126/91 A |
| 6,588,416 B2 * | 7/2003 | Landais | .................. | F23L 15/04 126/91 A |
| 6,872,070 B2 * | 3/2005 | Moore | .................... | F23D 14/70 431/9 |
| 7,343,753 B2 * | 3/2008 | Kidwell | ..................... | F28D 7/12 62/260 |
| 7,363,769 B2 * | 4/2008 | Kidwell | ..................... | F24T 10/17 62/260 |
| 7,370,488 B2 * | 5/2008 | Kidwell | ............. | F28D 20/0052 62/260 |
| 7,373,785 B2 * | 5/2008 | Kidwell | ..................... | F28F 1/00 62/260 |
| 7,377,122 B2 * | 5/2008 | Kidwell | ..................... | F28F 1/00 62/260 |
| 7,762,807 B2 * | 7/2010 | Linck | ...................... | F23C 3/002 431/215 |
| 8,162,040 B2 * | 4/2012 | Briselden | ............... | F23C 13/00 165/142 |
| 8,414,690 B2 * | 4/2013 | Hansen | ................... | F28D 13/00 95/115 |
| 10,161,632 B2 * | 12/2018 | Wunning | ................ | F23D 14/12 |
| 10,458,646 B2 * | 10/2019 | Vandegrift | ................ | F23C 7/06 |
| 2003/0075214 A1 * | 4/2003 | Fraas | ..................... | H02S 10/30 136/253 |
| 2003/0235798 A1 * | 12/2003 | Moore | .................... | F23D 14/70 431/353 |
| 2005/0014102 A1 * | 1/2005 | Harbeck | ................. | F23D 14/66 431/215 |
| 2006/0201180 A1 * | 9/2006 | Kidwell | ................. | F24T 10/17 62/260 |
| 2007/0023164 A1 * | 2/2007 | Kidwell | ................. | F24T 10/17 165/45 |
| 2007/0224565 A1 * | 9/2007 | Briselden | ............... | F23L 15/04 431/207 |
| 2009/0277969 A1 * | 11/2009 | Briselden | .................. | F24D 5/08 237/76 |
| 2010/0092897 A1 * | 4/2010 | Wunning | ................ | F23C 9/006 431/6 |

(56) References Cited

U.S. PATENT DOCUMENTS

| | | | | |
|---|---|---|---|---|
| 2011/0041689 | A1* | 2/2011 | Hansen | B01D 53/0438 |
| | | | | 95/115 |
| 2012/0193079 | A1* | 8/2012 | Briselden | F23M 9/10 |
| | | | | 165/154 |
| 2013/0260323 | A1* | 10/2013 | Hong | F23C 3/002 |
| | | | | 431/6 |
| 2016/0091199 | A1* | 3/2016 | Vandegrift | F23C 9/08 |
| | | | | 431/116 |

FOREIGN PATENT DOCUMENTS

| | | |
|---|---|---|
| CN | 104245165 A | 12/2014 |
| CN | 101725985 B | 1/2015 |
| DE | 1230163 B | 12/1966 |
| JP | H371232 U | 7/1997 |

* cited by examiner

LOW NOX, HIGH EFFICIENCY, HIGH TEMPERATURE, STAGED RECIRCULATING BURNER AND RADIANT TUBE COMBUSTION SYSTEM

CROSS-REFERENCE TO RELATED APPLICATION

This application is a continuation application of and claims priority under 35 U.S.C. § 120 to U.S. patent application Ser. No. 14/863,563, entitled "LOW NOX, HIGH EFFICIENCY, HIGH TEMPERATURE, STAGED RECIRCULATING BURNER AND RADIANT TUBE COMBUSTION SYSTEM," by Chris Edward VANDEGRIFT et al., filed Sep. 24, 2015, which claims priority under 35 U.S.C. § 119(e) to U.S. Patent Application No. 62/055,095, entitled "LOW NOX, HIGH EFFICIENCY, HIGH TEMPERATURE, STAGED RECIRCULATING BURNER AND RADIANT TUBE COMBUSTION SYSTEM," by Chris Edward VANDEGRIFT et al., filed Sep. 25, 2014, both of which are assigned to the current assignee hereof and incorporated herein by reference in their entireties.

BACKGROUND OF THE INVENTION

Combustion of fossil fuels introduces emissions into the atmosphere, such as nitrogen oxides (NOx). NOx emissions arise from nitrogen present in the combustion air and from fuel-bound nitrogen in coal or fuel oil, for example. Conversion of fuel-bound nitrogen to NOx depends on the amount and reactivity of the nitrogen compounds in the fuel and the amount of oxygen in the combustion area. Conversion of atmospheric nitrogen, N2, present in the combustion air to NOx is temperature-dependent; the greater the flame temperature in the combustion area, the greater the resultant NOx content in the emissions. One way of reducing NOx content is to create a fuel-rich combustion area followed by a fuel-lean combustion area, which can be achieved by staging the introduction of air into the combustion chamber. Recirculating flue gas into the flame is another technique to limit NOx emissions.

SUMMARY OF THE INVENTION

Embodiments of the present invention include high-temperature staged recirculating burners and radiant tube burner assemblies that provide high efficiency, low NOx and CO emissions, and uniform temperature characteristics. One such staged recirculating burner includes a combustion tube having inside and outside helical fins forming opposing spiral pathways for combustion gases and products of combustion, a combustion nozzle coupled to the combustion tube, a gas tube running axially into the combustion tube, and a staging gas nozzle coupled to the gas tube, where the staging gas nozzle includes radial exit holes into the combustion tube and an axial gas staging tube extending into the combustion nozzle to stage combustion.

Some embodiments of such a staged recirculating burner can include a ceramic wall as part of the combustion tube that separates the flow of the combustion gases and the flow of the products of combustion, where the directions of flow of the combustion gases and the products of combustion are opposite. In many embodiments, the combustion tube can be made of silicon carbide, and/or the combustion nozzle is a conically shaped combustion nozzle.

A staged recirculating burner can further include a heat exchanger coupled to the combustion tube that heats the combustion gases provided to the combustion tube using the products of combustion from the combustion tube. In such embodiments, the combustion tube and the heat exchanger may be connected by a specialized silicon carbide thread allowing the combustion tube to be adjustable. The gas tube of the burner may extend through the central axis of the heat exchanger and into the combustion tube.

In some embodiments, the staging gas nozzle injects gas radially into a spiral flow of preheated air flowing through the combustion tube and, in such embodiments, the staging gas nozzle can inject only a portion of the gas through the radial holes of the staging gas nozzle, thus creating a gas mixture that is substantially lean to suppress the temperature of products of combustion, and inject the reminder of the gas through the axial gas staging tube.

An example radiant tube burner assembly includes a staged recirculating burner, as described above, an outer radiant tube coupled to the burner, an inner recirculating tube located concentrically inside the outer radiant tube, where the outer radiant tube and the inner recirculating tube forming an annulus between the outer and inner tubes, and a turning vane spacer located inside the outer radiant tube and positioned between the distal end of the inner recirculating tube and the distal end of the outer radiant tube to cause products of combustion to flow through the annulus between the outer radiant tube and the inner recirculating tube.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Structure of Staged Recirculating Burner and Radiant Tube Burner System

Figure 1:
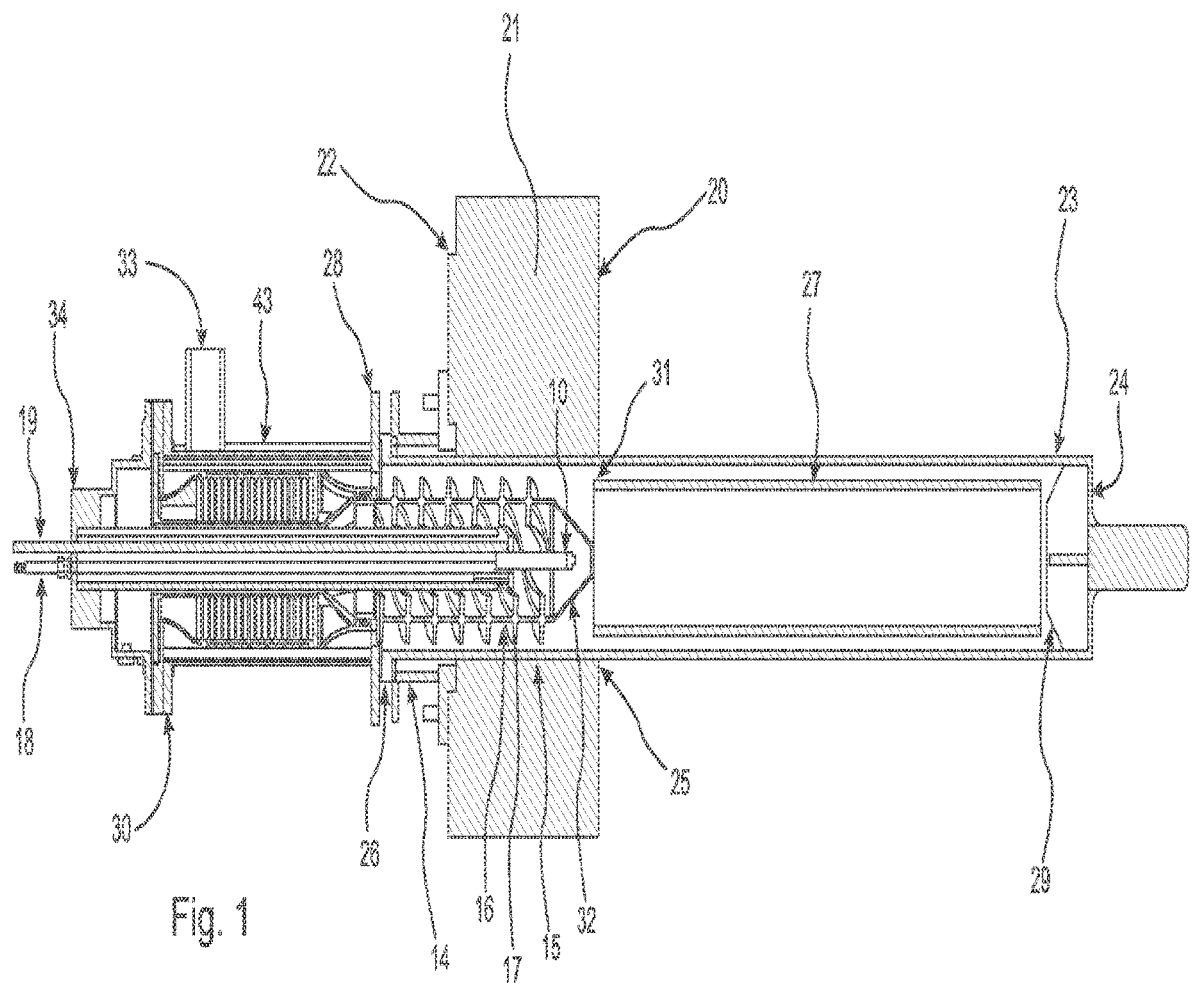
FIG. 1 is a schematic diagram illustrating a single-ended radiant (SER) tube burner assembly, according to an example embodiment of the present invention.

An example embodiment of a self-recuperative, single-ended, radiant tube burner system assembled within a chamber of a conventional heat treating furnace is shown in FIG. 1. One wall 20 of the furnace is shown in FIG. 1 and is typically made of a refractory material 21 whose outer side is covered by a metal skin 22. The self-recuperative single-ended radiant tube burner system includes an elongated (outer) radiant tube 23 disposed within the furnace chamber and made of a silicon carbide, metallic, or other suitable heat-resistant material. The outer radiant tube 23 extends through a cavity 25 in the furnace and the downstream end of the outer tube is closed as indicated at 24. The outer radiant tube 23 includes an outer flange 26 that is secured into a furnace mounting flange 14 on the outside wall of the furnace and may be secured into position using an exhaust housing flange 28 that mounts a burner assembly 30 to the furnace. The burner assembly 30 is secured to and is partially disposed in the radiant tube 23 to generate a high velocity, high-temperature flame to appropriately heat the furnace. Assembled concentrically inside the outer radiant tube 23 is an inner radiant tube 27 made of silicon carbide. The inner radiant tube 27 is properly positioned away (e.g., three inches) from the downstream (distal) end of outer tube 23 using spacer (turning vane) 29. The length of the inner tube 27 is furnace specific but the inlet face 31 is aligned coincident to the inside furnace refractory wall 20. Likewise, the outlet component of burner assembly 30 (i.e., combustion nozzle 32) is also parallel to the inside wall of the refractory 20 and the face of the inner radiant tube 31.

Figure 2:
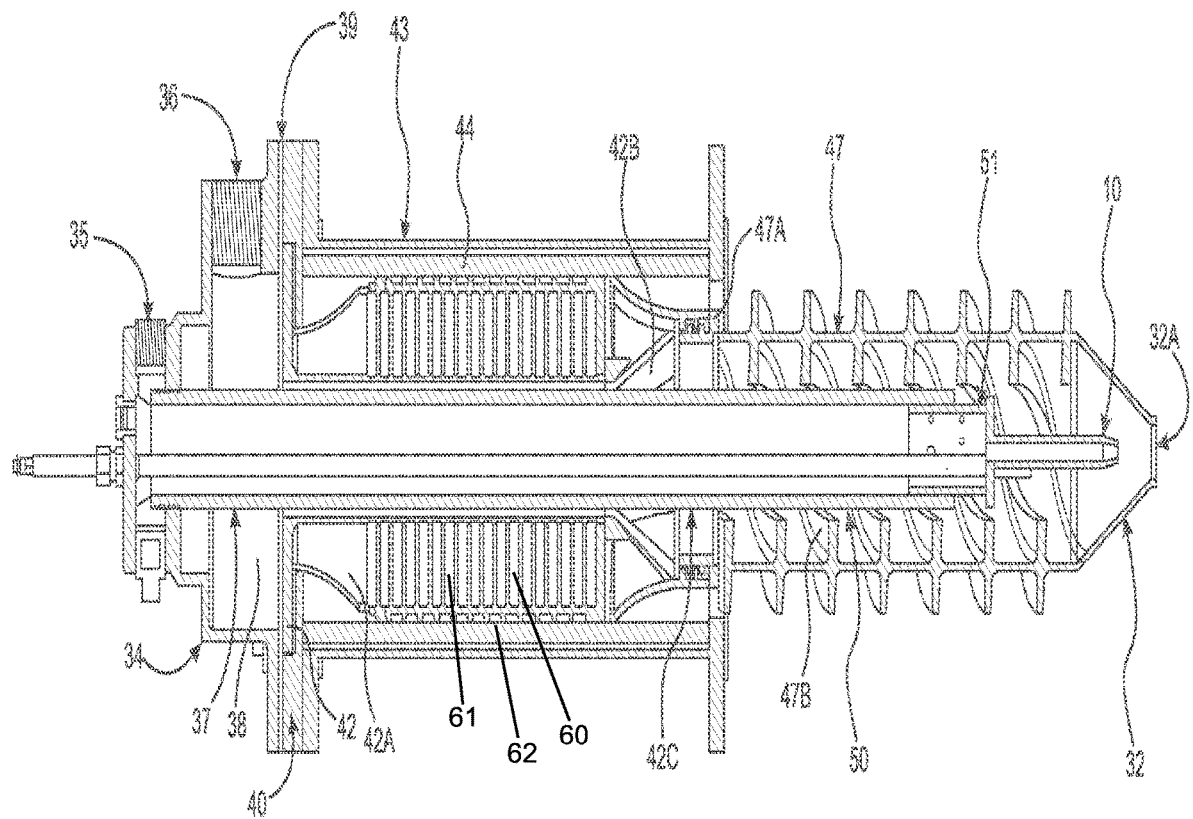
FIG. 2 is a schematic diagram illustrating a burner assembly, according to an example embodiment of the present invention.

Referring to FIG. 2, there may be a number of components, for example, that comprise an example staged recirculating burner assembly 30: an inlet housing 34, gas tube 37, exhaust housing 43, heat exchanger 42 (such as, for example, a heat exchanger as disclosed in U.S. Pat. No. 8,162,040), gas nozzle 51, and combustion tube 47. Combustion air is routed via a pipe into the burner inlet housing 34 via aperture 36, and communicates with a blower (not shown) or other means for producing a flow of forced combustion air. Also connected to the burner inlet housing 34 is a fuel supply line 35 that is in communication with an elongated gas pipe 37.

Figure 5:
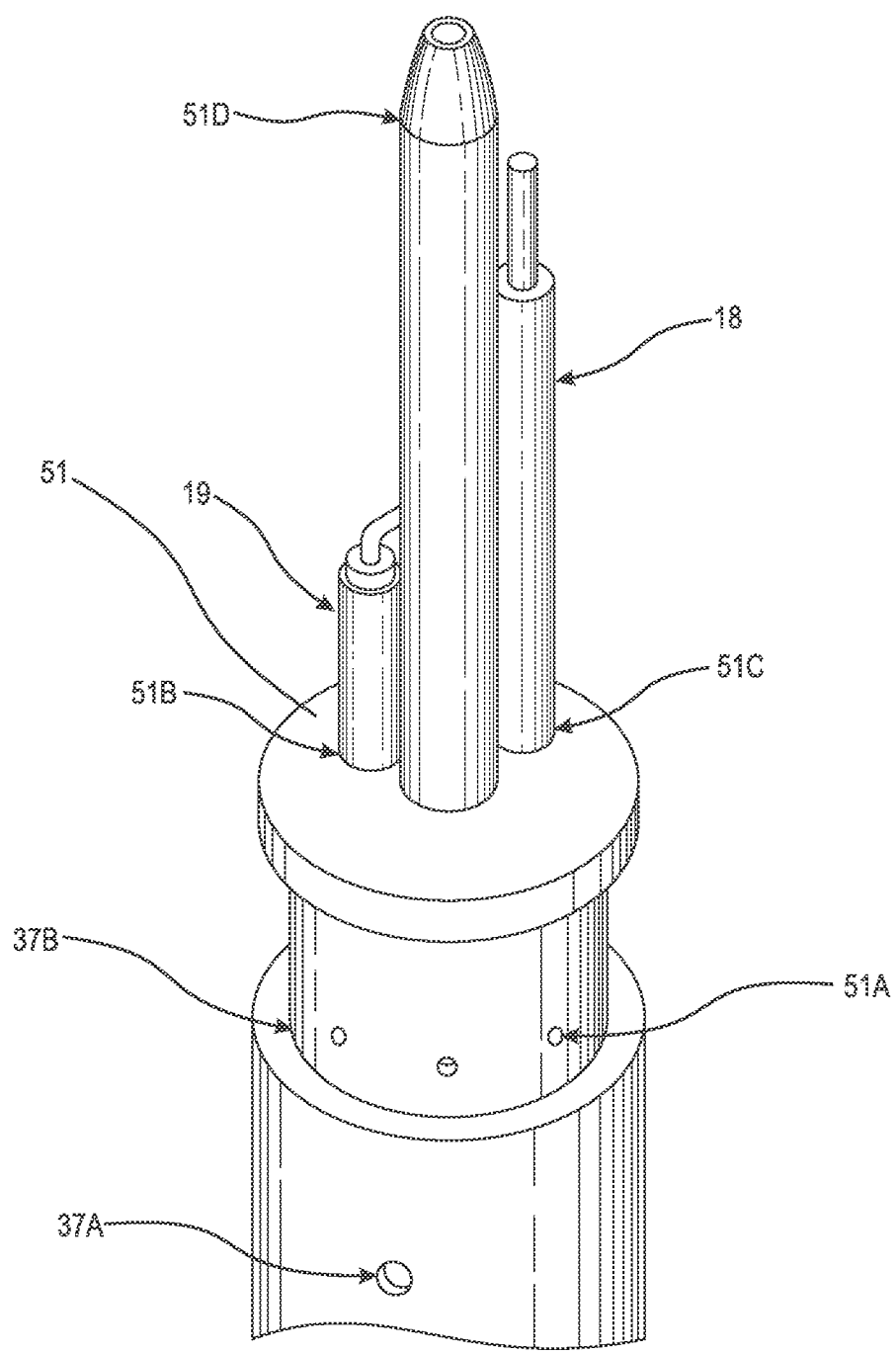
FIG. 5 is a schematic diagram illustrating a gas tube/gas nozzle assembly, according to an example embodiment of the present invention.

The gas pipe 37 extends through the central axis of the assembly downstream through heat exchanger 42 and into the combustion tube 47 where it supports gas nozzle 51. The inlet housing 34 and gas nozzle 51 may be designed specifically to communicate in such a way that spark rod 19 and flame sensor 18 (FIG. 1) can be placed inside of the gas tube 37. As shown in FIG. 5, the spark rod 19 may extend through gas nozzle 51 via 51B and an electrode can be placed approximately an inch downstream in order to ignite the fuel/air mixture discharged therefrom. Flame sensor 18, connected to an indicator, may extend through gas nozzle 51 via 51C and can be positioned approximately three inches downstream. Flame sensor 18 detects the presence of a flame and, via appropriate indication, when the flame has been extinguished. Gas tube 37 may be made from 1.5" schedule 80 stainless steel tube in order to withstand the exposure to the high temperatures generated by the combustion itself just downstream and the recuperation of the combustion gases by both the combustion tube 47 and the heat exchanger 42. Gas nozzle 51 may be made of silicon carbide to provide enhanced exposure to the high-temperature environment and allow steady and consistent delivery of natural gas. Gas nozzle 51 may be assembled into gas tube 37 and fixed using set screws (e.g., three set screws 120 degrees apart 37A), as shown in FIG. 5. A small gap 37B created by the inner diameter of the gas tube 37 and outer diameter of the gas nozzle 51 may be sealed off using ceramic putty, ensuring no gas flows through the gap space.

Figure 3:
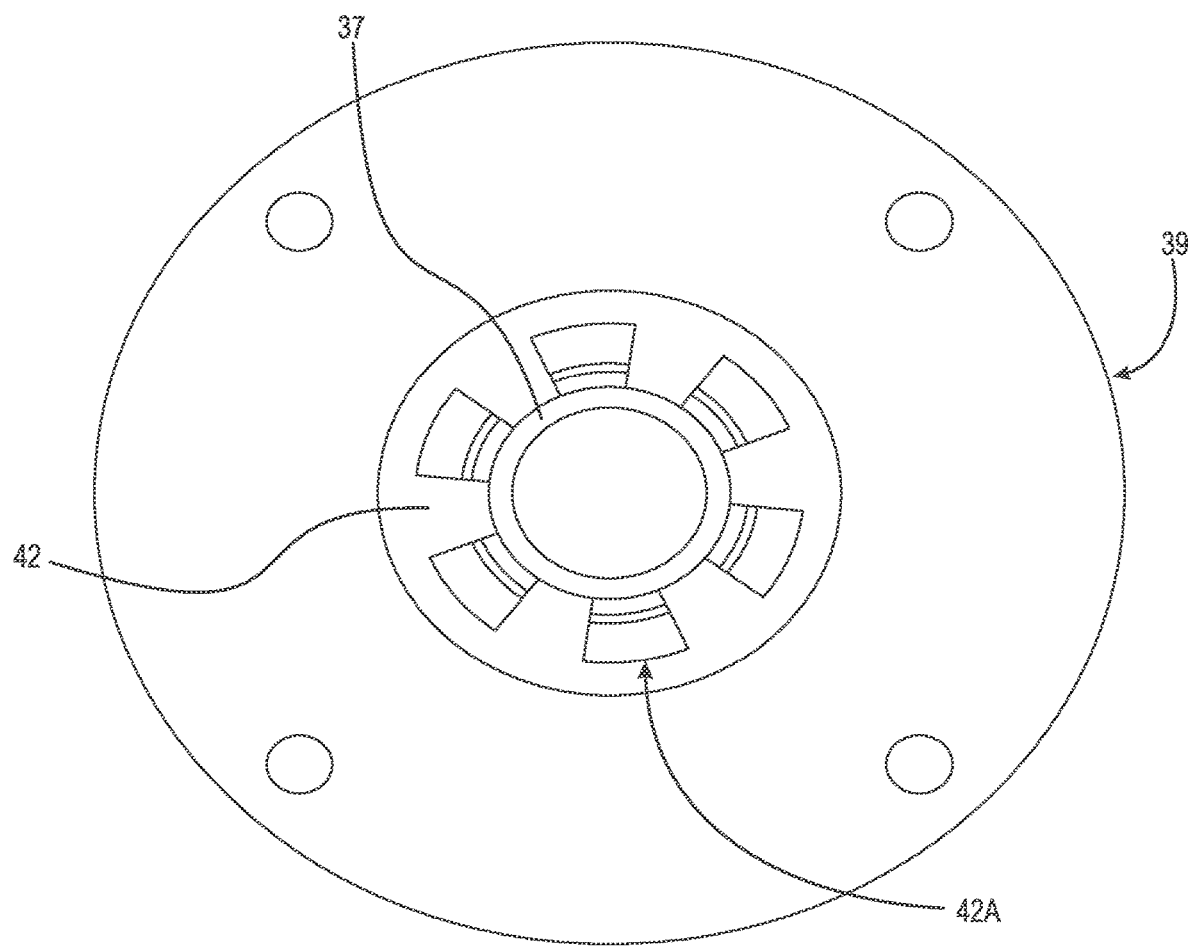
FIG. 3 is a schematic diagram illustrating a combustion air heat exchanger inlet, according to an example embodiment of the present invention.

Once combustion air has entered the inlet housing 34 via inlet port 36, it fills void 38 (FIG. 2) around the gas tube 37. A gasket 39 between the burner inlet housing 34 and the heat exchanger spacer flange 40 seals the combustion air into this void and forces the air to pass into the introductory port section (e.g., about three inches long) of the heat exchanger 42 where the air begins to wind into individual ports 42A that form into rounded rectangular channels 42E. In some example embodiments, there may be six individual ports 42A. FIG. 3 illustrates example inlet ports 42A of the heat exchanger 42.

The heat exchanger 42 may be held in place via compression of a spacer flange 40 between the burner inlet housing 34 and exhaust housing 43 (e.g., the inlet into which the heat exchanger flange is concentrically inserted). The exhaust housing 43 is lined with a high-temperature insulation sleeve 44 that fills the space between the inner diameter of the exhaust housing 43 and the outer diameter of the heat exchanger 42. This insulation acts as a barrier between the heat exchanger 42 and the physical structure of the exhaust housing, keeping the temperatures low enough to allow it to be manufactured from regular mild steel, for example.

Figure 4:
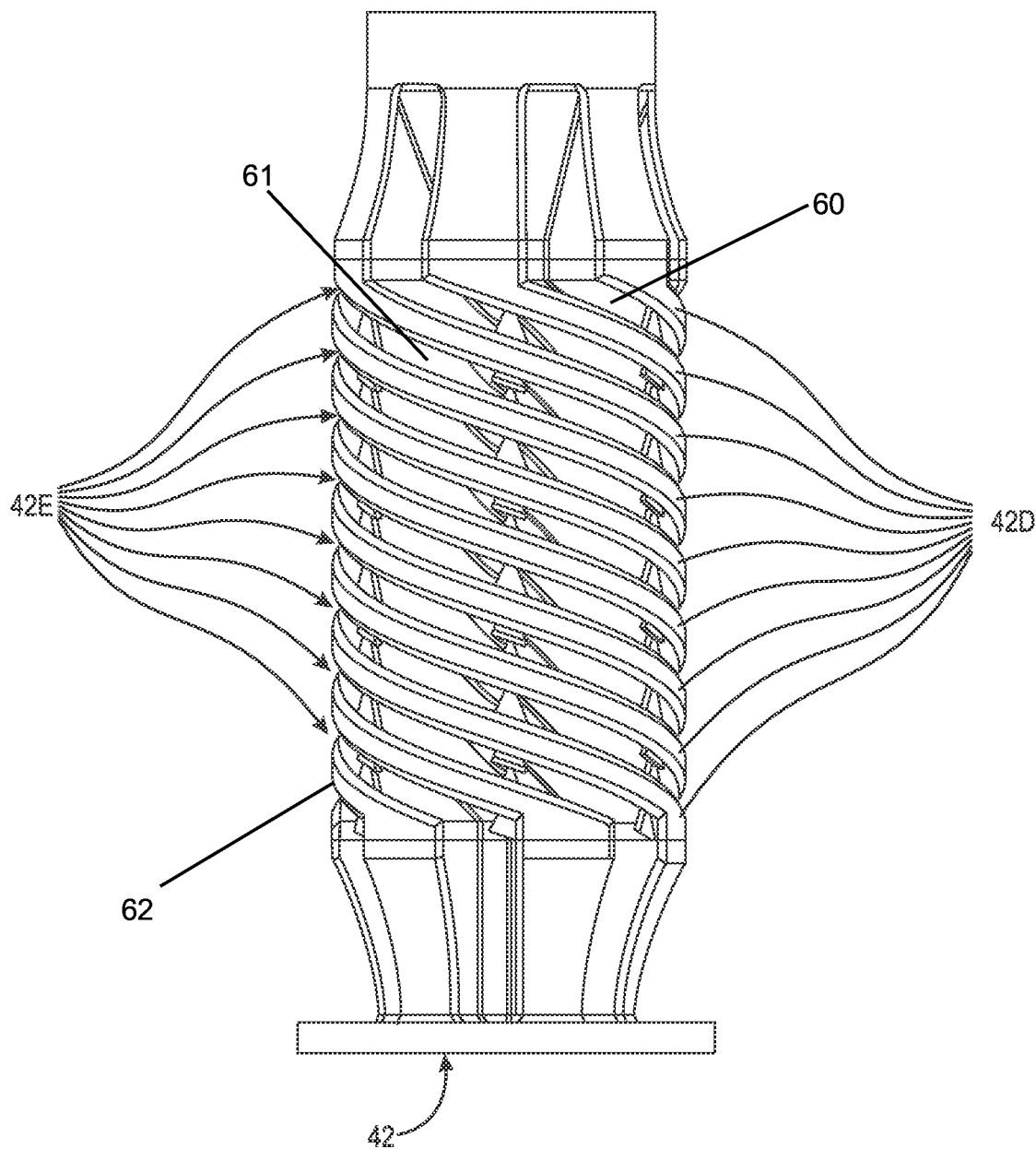
FIG. 4 is a schematic diagram illustrating a heat exchanging surface, according to an example embodiment of the present invention.

The insulation sleeve 44 locks in the helical annulus 42D (shown in FIG. 4) of the outside surface created by the helical heat exchanger combustion air channels 42E. The combustion air passes axially and helically at approximately 0.8 inches per revolution for 7 inches, for example, through the rounded rectangular channels 42E. After passing through approximately nine revolutions, for example, all air combines at 42B (FIG. 2) in the transition between the heat exchanger 42 and combustion tube 47, which may be approximately 3.25 inches long, for example.

Heat exchanger 42 and combustion tube 47 may be connected by a specialized silicon carbide thread 47A (FIG. 2). Heat exchanger 42 may have a special female thread, while combustion tube 47 may have special male thread. This connection allows for the heat exchanger to be a standard length, and the combustion tube to be adjusted to suit based on the furnace application. Once the combustion air has entered the combustion tube 47, it enters another helical annulus created by the outer diameter 50 (FIG. 2) of the gas tube 37, the inner diameter of the combustion tube 47 (FIG. 2), and the inner diameter of a spiral finned pathway 47B that runs axially downstream at a rate of approximately 1.67 inches per revolution, for example, and ends at the combustion nozzle 32. As the combustion air moves axially and radially for 5 revolutions, for example, the air is brought across the staging gas nozzle 51, where natural gas is injected into the combustion air by eight small holes 51A (FIG. 5) positioned about 45 degrees apart, for example, circumferentially. What is then a gas/air mixture, continues to travel axially and radially at 1.67 inches per revolution, for example, for approximately two full revolutions before moving into the combustion nozzle 32. Concurrently, a staged gas extension tube 51D (FIG. 5) injects gas downstream ahead of the centrifugal air and gas mixture into the combustion nozzle 32 and into the inner radiant tube 27 to intentionally stage combustion. The cross sectional area ratio of the radial holes to axial hole ranges from 1:1 to 10:1 is such that the amount of gas that can exit radially is between 50% and 90% of the total gas.

The gas/air mixture then enters the outlet end of the combustion tube 47 and is sent through a conically shaped combustion nozzle 32 designed to increase the velocity of the flame as aperture 32A directs the flame toward the inner radiant tube 27 (FIG. 1). Combustion is completed inside the inner radiant tube 27 and the hot products of the combustion are passed down the tube toward the downstream end of outer tube 24, where the hot gases are turned 180 degrees and forced to flow in the reverse direction toward the first end of the inner radiant tube 31 through the annular gap between outer radiant tube 23 and inner radiant tube 27. As the products of combustion near the first end of inner radiant tube 31, the high velocity flame created by the conically shaped reducer entrain some of the gases causing recirculation back into the ongoing combustion.

Both of the helical inserts in the heat exchanger 42 and combustion tube 47 may be constructed of silicon carbide. The helical fluid channeling design increases the conductive heat transfer surface area that is the outer ceramic walls of both heat exchanging surfaces. A silicon carbide composition is advantageous in that both components experience less thermal expansion when subjected to significant temperature changes than would be seen if produced out of another material. This also enhances the ability of the helical heat exchangers to match and couple with the rest of the burner system, reducing thermally-induced stresses that can be associated with inter-component couplings during high-temperature operating conditions.

When the products of heat generation exit the annulus, a portion of the products of heat generation are recirculated, while a significant portion enters an annular channel created by the inner diameter 15 (FIG. 1) of the outer radiant tube 23, the outer diameter 16 of the combustion tube 47, and a spiral finned (e.g., 1.67 inches per revolution) pathway 47B running the length of the combustion tube 47 toward the exhaust housing 43. The cross section of this spiral finned pathway 47B is shown in FIG. 2 as an extension of the fins 17 located on the inside of the combustion tube 47; therefore, setting the fluid path on both sides of the combustion tube in sequence for conductive heat transfer through the ceramic wall separating the fluids. The increased heat transfer surface area created by the inner and outer finned combustion tube 47 reduces the exhaust temperature of the flue gas enough such that the highly effective heat exchanger 42 may be mounted into the external portion (exhaust housing 43) of the single-ended radiant tube burner system, keeping the temperatures low enough to allow it to be manufactured from regular mild steel, for example.

As the products of combustion exit the first recuperative section created by the combustion tube 47, the products transition into the exhaust housing 43 where the products enter the helical gaps 42E (FIG. 4) formed from the helical heat exchanger combustion air channels 42E and the insulation sleeve 44 (FIG. 2). The combustion gases pass through the approximate 0.8 inches per revolution annular gap, for example, for the entire axial length of the heat exchanger 42 and finally exit the burner system via the exhaust housing outlet 33 (FIG. 1). The temperature of the heat exchanging fluid at the exhaust housing outlet 33 is such that the heat that would otherwise be lost to the atmosphere has been transferred to the combustion air, heating it to temperatures between 1050° F. and 1250° F. and drastically improved the efficiency of the self-recuperating single-ended radiant tube burner system.

Example features of the above include a combustion tube that is helically finned on inside and outside, forming a spiral finned pathway (which may run 1.67 inches per revolution, for example) setting the fluid path of both the combustion air (inside) and hot products of combustion (outside) in sequence for conductive heat transfer through a ceramic wall separating the fluids. An increased heat transfer surface area created by the inner and outer finned combustion tube reduces the exhaust temperature of the flue gas enough such that the highly effective heat exchanger may be mounted into the external portion (exhaust housing) of the single-ended recuperative (SER) burner, keeping the temperatures low enough to allow the exhaust housing to be manufactured from regular mild steel, for example. Inner helical fins can also provide improved mixing characteristics as natural gas is dispersed into the already swirling combustion air by the gas nozzle, which is strategically placed downstream from the combustion nozzle. The improved mixing leads to a decrease in combustion losses as the gas/air mixture is accelerated through the conically shaped reducer (combustion nozzle) and the flame is ignited.

Another example feature includes the particular selection and assembly of the combustion tube and heat exchanger. Silicon carbide composition is advantageous in that both the combustion tube and heat exchanger experience less thermal expansion when subjected to significant temperature changes than would be seen if produced out of another material. This also enhances the ability of the helical heat exchangers to match and couple with the rest of the burner system, reducing thermally-induced stresses that can be associated with inter-component couplings during high-temperature operating conditions. The combustion tube and heat exchanger can be connected by a specialized silicon carbide thread, where the heat exchanger has a special female thread and the combustion tube has a corresponding male thread. This threading allows for the heat exchanger to be a standard length and the combustion tube length to be conditioned for the specific furnace application.

Another example feature includes the heat exchanger being used for a unique channel orientation. Combustion air can be passed into individual ports (e.g., six ports) in the introductory section that forms into rounded rectangular channels that pass the combustion air axially and helically at approximately 0.8 inches per revolution, for example. The combination of short period and helical structure drastically increase the heat transfer surface area and allow maximum heat transfer between the incoming combustion air and outgoing products of combustion. The heat exchanger can operate without the need to specify an oversized blower or expanded method to produce forced air at an increased rate to overcome pressure drop caused by channel design.

Another example feature includes a silicon carbide axial tube through the gas tube nozzle. Silicon carbide provides enhanced exposure to the high-temperature environment with minimal thermal expansion, allowing steady and consistent dispersion of natural gas. Radial holes in the nozzle inject gas into the spiral flow of pre-heated combustion air increasing mixing characteristics leading to decreased combustion losses. Axial holes allow for a spark and flame rod to be internal to the gas tube and inserted to the point of combustion. An axial tube through the gas tube nozzle allows gas to flow axially downstream ahead of the centrifugal air and gas mixture into the combustion nozzle and into the inner radiant tube to intentionally stage combustion.

The disclosed example embodiments provide advantages over prior systems, such as increased efficiency, a more customizable length for the combustion tube, uniformity with hot spot over average (HSOA) being less than 50 degrees Fahrenheit (which provides more even heating to the load and longer tube life when using an alloy outer tube), NOx emissions less than 240 ppm and CO emissions less than 10 ppm at 3% oxygen across all fire rates, and the option of an all-ceramic design (e.g., gas nozzle, inner tube, outer tube, heat exchanger, and combustion tube) that allows for high-temperature application and reduced maintenance cycles over existing alloy and ceramic single-ended recuperative (SER) burners.

Operation of Staged Recirculating Burner and Radiant Tube Burner System

As disclosed above, an example particular embodiment may include, as shown in FIG. 2, a gas tube 37, exhaust housing 43, preheat flow reducer 42A, exhaust insulating sleeve 44, threaded combustion tube joint 47A, inner and outer finned combustion tube 47, staging gas nozzle 51, combustion nozzle 32, centering spacer 29, air/gas inlet housing 34, air inlet 36, gas inlet 35, gas staging tube 10, and heat exchanger 42. Such a staged recirculating burner may operate in a radiant tube combustion system that may include, as shown in FIG. 1, an inner furnace wall 20, furnace refractory 21, outer refractory wall/shell 22, outer radiant tube 23, outer radiant tube cap and support 24, refractory furnace opening 25, outer radiant tube flange 26, support flange 14, inner recirculating tube 27, flame rod 18, and igniter 19.

As an example of operation, a gaseous fuel enters the gas inlet 35 and of the air/gas inlet housing 34 and air enters the air inlet 36 of the air/gas inlet housing 34 in an air-to-gas ratio of approximately between 5:1 and 15:1, for example, which is sufficient to, when ignited, produce a flame and products of combustion. The gaseous fuel travels down the gas tube 37 where it enters the staging gas nozzle 51, which can include both radial exit holes and an axial gas staging tube 10. The cross sectional area ratio of the radial holes to axial tube may range from 1:1 to 10:1, for example, such that the amount of gas that can exit radially is between 50% and 90% of the total gas. Simultaneously with the gaseous fuel, air enters the fluid inlet of the heat exchanger 42 and the inner spiral channel 60 of the heat exchanger 42, which defines a flow pathway through the heat exchanger 42 that may have a substantially rectangular cross-section. The air receives energy from the outer wall of the spiral channel 60 and is preheated to a temperature greater than 400 degrees Celsius before it exits the spiral channel of the heat exchanger 42 as preheated air and then flows into the preheat flow reducer 42B. The outer wall of the spiral channel 60 receives energy from products of heat generation that flows through the surrounding fluid path that the outer spiral channel 62 forms by the outer wall with a substantially rectangular cross-section. The products of heat generation are cooled as the energy is transferred to the outer wall and further to the air flowing through the heat exchanger 42. The products of heat generation exit through the exhaust housing 43. The exhaust housing 43 contains an exhaust insulating sleeve 44 that minimizes the heat lost to the atmosphere such that the maximum amount of heat can be transferred to the outer spiral 62 wall and, thus, the air.

The preheated air enters the preheat flow reducer attached to the inner and outer finned combustion tube 47, which itself may be attached to the preheat flow reducer by a threaded ceramic combustion tube joint 47A. The preheated air is further heated to a highly preheated air temperature that exceeds 500 degrees Celsius in the inner and outer finned combustion tube 47, which contains one or more spiral fins 17, by the products of heat generation flowing on the outside of the inner and outer finned combustion tube 47. The products of heat generation are cooled by the inner and outer finned combustion tube to a point where the mounting of the outer radiant tube 23 and outer radiant tube flange 26 can be mounted between the step flange 14 and the exhaust housing 43 flange without the use of exotic high-temperature materials.

The highly preheated air exits the fins 17 of the inner and outer finned combustion tube 47 in a spiral flow path where a staging gas nozzle 51 is positioned to inject gas radially into the spiral flow of highly preheated air. The position of the staging gas nozzle 51 and its radial holes is such that the mixture of air and gas is properly mixed to form a mixture that can be ignited by tip of the igniter 19, and that flows into and further combusts in the combustion nozzle 32 attached to the inner and outer finned combustion tube 47 by a high-temperature ceramic threaded connection, for example. Not all of the gas is injected through the radial holes of the staging gas nozzle 51. The mixture that is ignited is substantially lean to suppress the temperature of products of heat generation, which suppresses the formation of oxides of nitrogen. The products of heat generation exit the combustion nozzle 32 at a velocity sufficient to entrain products of heat generation flowing through an annulus formed by the inner recirculating tube 27 and the outer radiant tube 23 and further through the opening formed between the combustion nozzle exit 32A and the inside of the inner recirculating tube 27. The products of heat generation are at a sufficiently low temperature that the products of heat generation exiting the combustion nozzle are diluted sufficiently to further reduce the formation of oxides of nitrogen before the products of heat generation are fully combusted inside the inner recirculating tube 27 by exhaust gas recirculation.

The final amount of gas is injected into the partially combusted products of heat generation by an axial tube that may extend from the staging gas nozzle 51 and into the combustion nozzle 32. The gas is combusted fully before exiting the end of the inner recirculating tube 27. The combination of lean combustion, recirculating of products of heat generation, and gas staging of the products of combustion is sufficient to suppress the formation of oxides of nitrogen, minimize the temperature of combustion for suppression of the formation of oxides of nitrogen, and improve the temperature uniformity of heat released from the outer radiant tube 23.

The products of heat generation may be directed between the annulus formed by the outer radiant tube 23 and the inner recirculating tube 27 by a centering spacer (turning vane) that may include at least two uniform fins and promotes the reversal of flow from the products of heat generation into the formed annulus. As the products of heat generation flow between the formed annulus, a substantial amount of energy is transferred to the wall of the outer radiant tube 23 by both convection and radiation heat transfer. Energy is transferred through the wall of the outer radiant tube 23 by conduction. A substantial amount of energy is transferred from the outer radiant tube 23 to the inner furnace wall 20 by radiation heat transfer. When the products of heat generation exit the annulus, a portion of the products of heat generation is recirculated, while a significant portion enters the outer fins of the inner and outer finned combustion tube 47. The products of heat generation are cooled, as described above, by flowing over the inner and outer finned combustion tube 47 and heat exchanger 42 before exiting the system at the exhaust housing 33 exit.

While example embodiments have been particularly shown and described above, it will be understood by those skilled in the art that various changes in form and details may be made therein without departing from the scope of the invention. For example, the outer tube 23 may be finned, lobed, and/or twisted for improved heat transfer. The inner tube 27 may be finned, lobed, and/or segmented for improved heat transfer uniformity, combustion, and recirculation. The combustion nozzle 32, may include single or multiple nozzles, which are not necessarily round, and may include hole extensions for air staging. The gas nozzle 10 may include radial holes, axial holes, tangential holes, and or angled holes, which are not necessarily round, and may include hole extensions for gas staging. Holes can, for example, be round, oval, square, slots, or porous. The combustion tube 47 may be differently finned, lobed, and/or twisted for improved heat transfer. The turning vane 29 can be spiral or U-shaped with an inlet point to separate the flow. The inner tube 27 and outer tube 23 can use staged spiraling (rifling) or staged fins in order to reduce variation in the hot spot above average (HSOA) and reduce the HSOA value. As an example, the first one-third of the tube may be smooth and the last two-thirds finned. The outer tube 23 may be an alloy tube with a de-tuned silicon carbide air heater, which would be a low air pressure, reduced efficiency system that would allow for a higher pressure, higher efficiency, air heater to be installed. The heat exchanger 42 may be finned, lobed, and/or segmented for improved heat transfer uniformity, combustion. The gas nozzle 10 could be extended or retracted, of variable length, in combination with changes in shape and diameter of the conical combustion nozzle 32 and aperture 32A to change the emissions and thermal characteristics of the radiant tube heating system.

What is claimed is:

1. A heat exchanger insert comprising a ceramic body, the ceramic body comprising:
   a central bore;
   a helical annulus including a plurality of helical combustion air channels extending around the central bore in a length direction of the body, wherein each helical combustion air channel defines a flow pathway for combustion air to flow through the helical combustion air channel;
   an outer wall of the plurality of helical combustion air channels forms a surrounding fluid path for a combustion product to pass through;
   wherein the ceramic body comprises silicon carbide, and wherein the ceramic body is adapted to receive a central gas tube through an entirety of the central bore.

2. The heat exchanger insert according to claim 1, further comprising: a plurality of helical gaps formed between the plurality of helical combustion air channels.

3. The heat exchanger insert according to claim 1, wherein the heat exchanger insert is adapted so that the combustion air flowing through the plurality of combustion air channels is preheated to a temperature greater than 400° C. by energy from the combustion product passing through the surrounding fluid path when the combustion air exits the helical combustion air the channels.

4. The heat exchanger insert according to claim 1, wherein the plurality of helical combustion air channels includes at least six channels.

5. The heat exchanger insert according to claim 1, further comprising: an introductory port section having an individual port for each of the plurality of helical combustion air channels.

6. The heat exchanger insert according to claim 5, wherein each of the plurality of helical combustion air channels comprises a rounded rectangular channel.

7. The heat exchanger insert according to claim 1, wherein one revolution of each of the plurality of helical combustion air channels extends approximately 0.8 inches in the length direction of the body.

8. The heat exchanger insert according to claim 1, further comprising: a preheat flow reducer disposed at a downstream end of the heat exchanger insert and configured to combine the combustion air from the plurality of helical combustion air channels into a single flow into a combustion tube.

9. The heat exchanger insert according to claim 1, wherein the ceramic body comprises a threaded portion adapted to connect to a complementary threaded portion of a combustion tube.

* * * * *